(12) United States Patent
Seki

(10) Patent No.: US 6,974,309 B2
(45) Date of Patent: *Dec. 13, 2005

(54) STRAIGHT WING TYPE WIND AND WATER TURBINE

(75) Inventor: Kazuichi Seki, Kanagawa (JP)

(73) Assignee: Tokai University Educational System, Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 10/451,021

(22) PCT Filed: Nov. 8, 2002

(86) PCT No.: PCT/JP02/11655
§ 371 (c)(1),
(2), (4) Date: Jun. 19, 2003

(87) PCT Pub. No.: WO03/040555
PCT Pub. Date: May 15, 2003

(65) Prior Publication Data
US 2004/0170501 A1 Sep. 2, 2004

(30) Foreign Application Priority Data
Nov. 8, 2001 (JP) .................................. 2001-342925
Dec. 27, 2001 (JP) .................................. 2001-397075

(51) Int. Cl.$^7$ ............................................... F03D 3/06
(52) U.S. Cl. .......................... 416/227 R; 416/223 R; 416/223 A; 416/228; 416/242; 416/DIG. 2
(58) Field of Search ................. 416/223 R, 223 A, 416/227 R, 228, 235, 236 R, 242, 243, DIG. 2, 227 A

(56) References Cited

U.S. PATENT DOCUMENTS 4,046,489 A * 9/1977 Fairchild et al. ......... 416/223 R
4,264,279 A * 4/1981 Dereng .................... 416/227 A
4,285,636 A   8/1981 Kato et al.
4,435,124 A   3/1984 Zheng
6,360,534 B1 * 3/2002 Denniss ...................... 415/4.2

FOREIGN PATENT DOCUMENTS

| JP | 47-27845 A   | * | 7/1972 |
| JP | 56-42751     |   | 7/1981 |
| JP | 57-70962     |   | 1/1982 |
| JP | 2001-193629  |   | 7/2001 |

OTHER PUBLICATIONS

Mitsuo Makino, "Koku Kogaku no Kiso," Sangyo Tosho Kabushiki Kaisha, Jun. 25, 1984, pp. 95, 109.

* cited by examiner

Primary Examiner—Christopher Verdier
(74) Attorney, Agent, or Firm—Butzel Long

(57) ABSTRACT

A Straight blade type turbine has at least one two-dimensional blade positioned in parallel with and around a central axis of the turbine. The two-dimensional blade has a cross section with a blade chord turned around a center of the two-dimensional blade by an angle of 3° to −2° relative to a line perpendicular to another imaginary line connecting the central axis with the center of the two-dimensional blade. A distance between a fore end and the center of the cross section is 15 to 40 percent of a chord length of the blade. NC/R, which is calculated by a radius R extending from the axis to the center of two-dimensional blade, the chord length C, and the number N of the two-dimensional blades, is between 0.5 and 2.2. A maximum thickness of the two-dimensional blade is between 20 and 25 percent of the chord length. The turbine has a strut blade having a symmetric cross section joining the two-dimensional blade to a side of the central axis, the strut blade having a maximum thickness which is between 15 and 20 percent of a chord length of the strut blade.

4 Claims, 7 Drawing Sheets

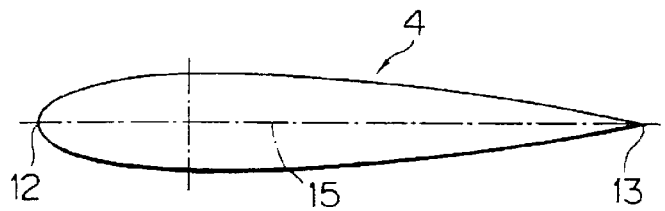
FIG. 3
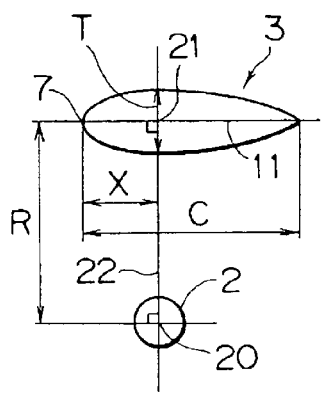 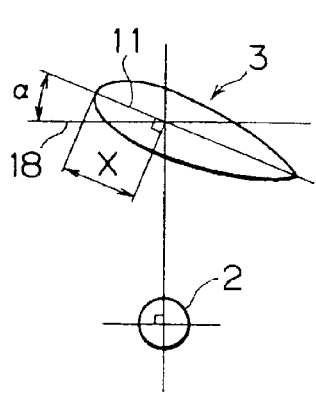 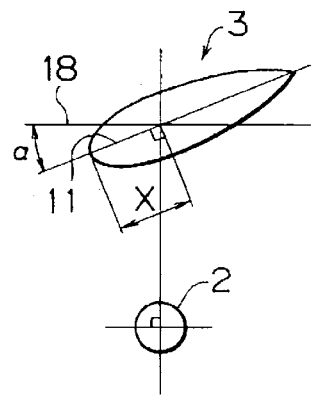
FIG. 4A  FIG. 4B  FIG. 4C
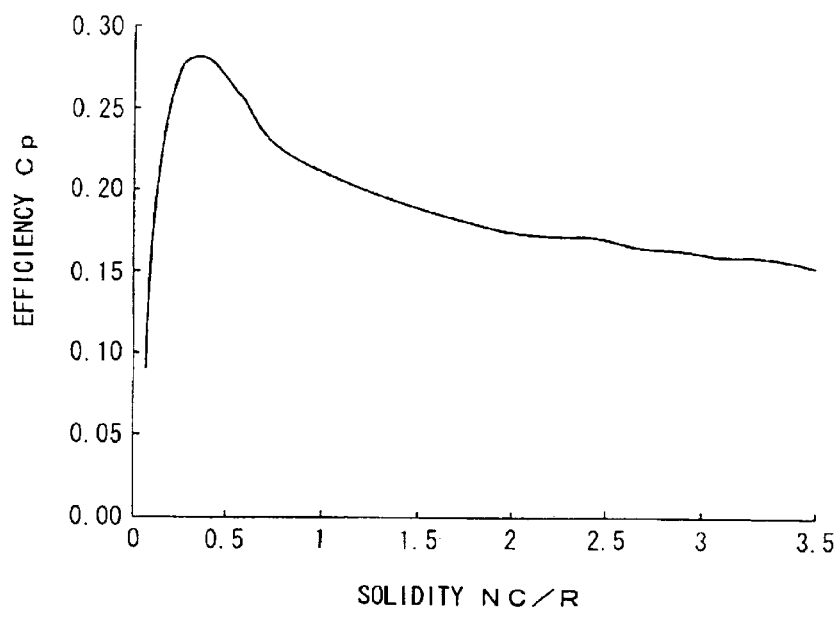
FIG. 8

STRAIGHT WING TYPE WIND AND WATER TURBINE

BACKGROUND OF THE INVENTION

1. Field of the Invention

The present invention relates to a straight blade type turbine having a plurality of straight blades each disposed around a vertical axis and connected to a side of the vertical axis by a strut blade. The straight blade has a cross section with a solidity, a direction angle, a thickness, etc. which improves the turbine in an operational efficiency, an easy self start, and less noise.

2. Related Art

Recently, a wind power generation and a water power generation have been reevaluated in view of lower energy consumption and a national environment conservation.

Regarding a wind power generation, a wind turbine having a propeller with a horizontal axis has been mainly used. A propeller wind turbine has a better self starting performance without a specified starting device but has a directivity relative to a wind direction. Thus, the wind turbine requires a device which faces the wind turbine against wind. Furthermore, the propeller has disadvantageously a complicated profile which is difficult in a mass production thereof.

Furthermore, some wind turbines having a vertical axis and a plurality of vertically elongated blades have been utilized. A famous one of them is a Darrieus wind turbine which has a plurality of elongated blades with an arc profile around a vertical shaft.

A vertical axis wind turbine has no directivity against a wind direction so that it is suitable for a wind varying in seasons like in Japan. In addition, the vertical axis wind turbine has a simplified blade profile and is easy for a mass production thereof. The vertical axis wind turbine has an operational efficiency (output coefficient) equal to that of a horizontal axis wind turbine. Herein, the efficiency represents a ratio of an output (a torque multiplied by a rotational number) to an energy of wind. Regarding a vertical axis water turbine used in a water power generation, the efficiency represents a ratio of an output of the water turbine to an energy of a water.

However, the conventional vertical axis wind turbine disadvantageously has an extremely low self start performance, which requires various kinds of equipment such as a starting motor and a device for controlling the motor. Thereby, the vertical axis wind turbine requires such equipment increased in size and cost although it has blades simplified in the profile. Furthermore, the vertical axis wind turbine needs to have an improved profile of the blades to obtain a higher efficiency (output coefficient). The vertical axis wind turbine has a larger acoustic noise which must be overcome. These problems also appear in a water turbine.

SUMMARY OF THE INVENTION

In view of the above mentioned situation, an object of the invention is to provide a turbine having a vertical axis generally, which achieves a better operational efficiency output coefficient). Preferably, the turbine has a better self starting performance without a special starting device and is quiet when rotated.

For achieving the object, a straight blade type turbine is provided which has at least one two-dimensional blade positioned in parallel with and around a central axis of the turbine, characterized in that the two-dimensional blade has a cross section with a chord length turned around a center of the two-imensional blade by an angle of 3° to −2° relative to a line perpendicular to another imaginary line connecting the central axis with the center of the two-dimensional blade;

a distance between a fore end and the center of the cross section is 15 to 40 percent of the chord length;

NC/R, which is calculated by a radius R extending from the axis to the center of two-dimensional blade, the chord length C, and the number N of the two-dimensional blades, is between 0.5 and 2.2; and a maximum thickness of the two-dimensional blade is between 20 and 25 percent of the chord length.

In this configuration, when the turned angle of the two-dimensional blade is not less than 5°, the turbine has an operational efficiency (output coefficient) is zero not to serve as a turbine. Meanwhile, the turned angle of 3° to −2° can provide at least a half of a maximum efficiency (output coefficient) of the turbine to obtain a better efficiency of the rotating turbine. When a distance between a fore end and the center of the cross section is 15 to 40 percent of the chord length, a better efficiency of the turbine is obtained, so that a head falling moment of the straight blade keeps a self starting performance of the turbine, although the efficiency is maximum at the mounting position where the distance is 25 percent of the chord length. Furthermore, NC/R (solidity or blade area ratio) not less than 0.5 provides a better self starting performance, while the solidity more than 2.2 decreases in the efficiency (output coefficient). Thus, NC/R of 0.5 to 2.2 maintains an appropriate efficiency as well as an adequate self starting performance of the turbine. Moreover, a maximum thickness of the two-dimensional blade, which is between 20 and 25 percent of the chord length, improves the turbine in the self starting performance and the efficiency of the turbine with keeping a sufficient strength of the two-dimensional blade. Accordingly, the turbine is better in the self starting performance and the efficiency thereof.

The straight blade type turbine comprises a strut blade having a symmetric cross section joining the two-dimensional blade to a side of the central axis, the strut blade having a maximum thickness which is between 15 and 20 percent of a chord length of the strut blade.

This configuration provides a low rotational resistance of the strut blade and maintains a sufficient strength of the two-dimensional blade, further improving the turbine in the self starting performance.

The straight blade type turbine has at least one two-dimensional blade positioned in parallel with and around a central axis of the turbine. The two-dimensional blade has a cross section provided with a stream line convex having a thickness which is substantially a half of a maximum thickness of the two-dimensional blade.

This configuration decrease air eddies generated in a rear side of the two-dimensional blade when used in a wind turbine, decreasing or diminishing an acoustic noise of the two-dimensional blade. Likewise, the configuration decreases water eddies generated in a rear side of the two-dimensional blade when used in a water turbine, decreasing or diminishing the noise due to the two-dimensional blade.

The straight blade type turbine has a convex stream line that has a thickness which is between 12 and 17 percent of a chord length of the strut blade. The configuration diminishes an air or water noise generated by the rotation of two-dimensional blade.

The turbine has a two-dimensional blade that has the stream line convex described above.

This configuration includes the turned angle of 3° to −2°, the position of the center of the cross section of 15 to 40 percent of the chord length, the NC/R determined between 0.5 and 2.2, the thickness of the two-dimensional blade being between 20 and 25 percent of the chord length, and has the cross section provided with a stream line convex. This achieves the turbine better in the self starting performance and the efficiency (output coefficient) thereof and decreases or diminishes an air or water noise thereof.

BRIEF DESCRIPTION OF THE DRAWINGS

FIG. 3 is a sectional view taken along line B—B of FIG. 1 for showing a section profile of a strut blade;

FIGS. 4A, 4B, and 4C are explanatory views showing the straight blade, the blade angle being zero in FIG. 4A, plus in FIG. 4B, plus in FIG. 4C;

FIG. 8 is a graph showing a relationship between a solidity and an efficiency of a turbine having another straight blade;

DETAILED DESCRIPTION OF THE PREFERRED EMBODIMENT

Referring to the accompanied drawings, embodiments of the invention will be discussed in detail hereinafter.

Figure 1:
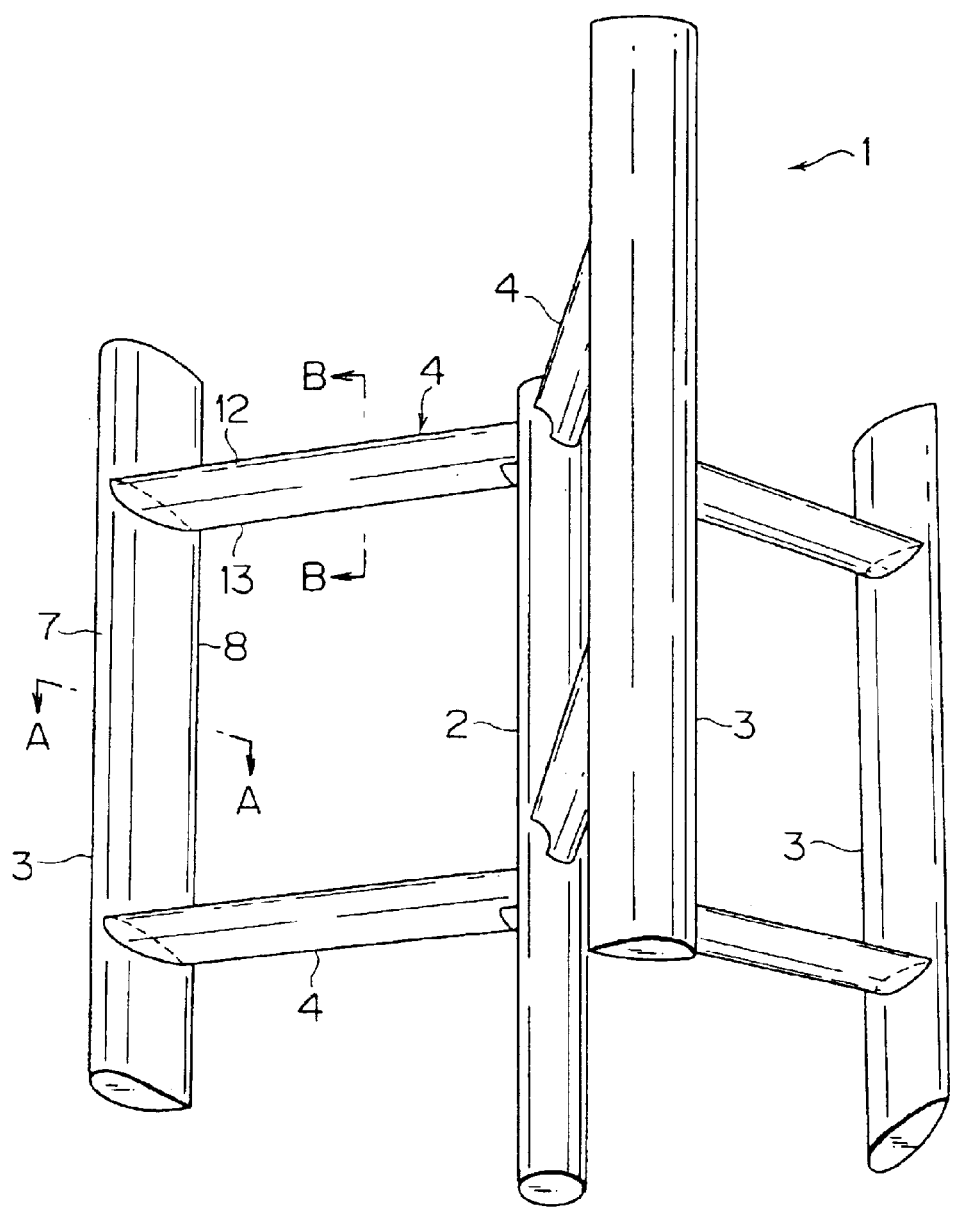
FIG. 1 is a perspective view showing an embodiment of a straight blade type turbine according to the present invention.

FIG. 1 shows a straight blade type turbine having a vertical axis, which is an embodiment of the invention. The straight blade type turbine 1 has a vertical shaft 2, a plurality (three in this embodiment) of main straight blades 3, and a plurality of horizontal strut blade 4 each joining each straight blade 3 to the shaft 2.

Figure 2:
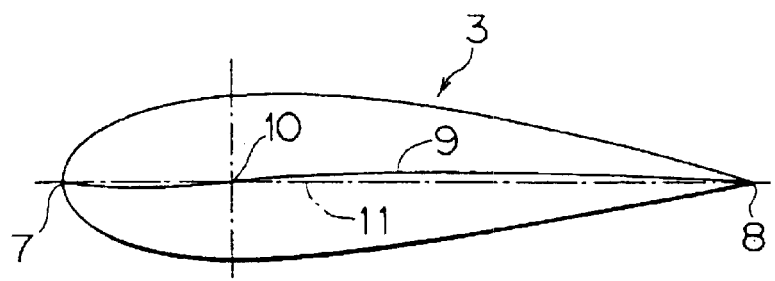
FIG. 2 is a sectional view taken along line A—A of FIG. 1 for showing a section profile of a straight blade.

As illustrated in FIG. 2 which is a sectional view (hatchings are omitted) taken along line A—A of FIG. 1, the straight blade 3 is an asymmetric two-dimensional blade. The straight blade 3 has a mean line 9 which is downwardly (downwardly in FIG. 2 and inwardly toward the shaft in FIG. 1) curved from a fore edge 7 and crosses a blade chord line 11 at a center 10 where the thickness of the two-dimensional blade is the maximum. The mean line 9 is curved upward from the center 10 to a rear edge 8 thereof. The strut blade 4 is arranged from the straight blade 3 downward in FIG. 2. This profile of the two-dimensional blade accomplishes a higher efficiency (output coefficient) of the turbine without changing the angle of the two-dimensional blade in response to a wind (water) direction. The profile of the straight blade 3 was proposed by the applicant of the present invention in Japanese Patent Publication NO. 56-42751.

As illustrated in FIG. 3 which is a sectional view taken along line B—B of FIG. 1, the strut blade 4 has a symmetric profile and a center line aligned with a mean line 15 from a fore edge 12 to a rear edge 13 thereof. The symmetric strut blade 4 decreases in a resistant force due to an air or wind stream at the fore edge 12, while the symmetric strut blade 4 increases in a resistant force due to an air or wind stream at the rear edge 13, providing a rotational force for the turbine.

When the strut blade 4 adopts an asymmetric blade having a sectional profile like the one of FIG. 2, an upper (FIG. 1) blade has a sectional profile the same as the one of FIG. 2 while a lower (FIG. 1) blade has a sectional profile obtained by turning upside down the one of FIG. 2.

Thereby, the upper two-dimensional blade generates a lift which is cancelled by a downward force generated by the lower two-dimensional blade, enabling a smooth rotation of the turbine. Furthermore, a trust force exerted on a bearing (not shown) of the shaft 2 decrease to improve a useful life of the bearing.

Preferably, the straight blade 3 and the strut blade 4 are made integrally of a light weight and high strength material such as a glass fiber and a carbon fiber. The turbine 1 can be used as a wind turbine or a water turbine. The blade has a high rigidity, which can resist against a strong water stream. The integrated body has no connection notches, which surely prevents the intrusion of water into the inside of the turbine. Furthermore, the light weight blade improves the turbine in a self an starting performance and efficiency (output coefficient) thereof.

Preferably, the shaft 2 is a hollow rotor shaft (2) made of a metal and has an end, for example, coupled to a rotational shaft of a generator (not shown). The hollow rotor shaft decrease the shaft 2 in weight, improving a starting performance of the turbine. The straight blade 3 may be a symmetric blade (symmetric section blade) where a wind or water direction is constant so that a blade angle may not be varied. A circular plate (not shown) may be fitted to each of top and bottom portions of the blades 3 and a center of each plate may be supported to eliminate the shaft 2.

The efficiency (output coefficient) of the turbine 1 varies with the blade angle of the straight blade 3 relative to the strut blade 4, the joining position of the straight blade 3 relative to the center of the shaft 2, the solidity of the turbine 1, etc. Also, the self starting performance varies with the solidity of the turbine 1, the thickness of the straight blade 3 and the strut blade 4, etc.

As illustrated in FIG. 4A, an imaginary line 22 radially extending from a center 20 of the shaft 2 is perpendicular to an imaginary line 22 of the straight blade 3 and crosses the imaginary line 22 at point 21. A ratio (%) of a distance X from the fore edge 7 of the straight blade 3 to the cross point 21 relative to a chord length C represents the blade center position. As illustrated in FIGS. 4A, 4B, and 4C, the blade angle is indicated by an angle α (°) between a line 18 and a blade chord line 11, where the line 18 is perpendicular to the radial imaginary line and the blade chord line 11 inclines inward or outward relative to the line 18. FIG. 4B shows a blade angle of +α while FIG. 4C shows a blade angle of −α and FIG. 4A shows a blade angle of 0°

The solidity is defined by NC/R, which is calculated by a radius R (meter) extending from the shaft center 20 to the cross point 22, the chord length C (meter), and the number N of the two-dimensional blades. A blade thickness value is represented by a ratio (%) of a maximum thickness of the blade to the chord length. The efficiency (output coefficient) is a ratio of a work (torque multiplied by a rotational speed of the turbine) to an energy (defined as 1) of a wind or a water.

An object of the invention is to provide a turbine having a vertical axis, which achieves a better self starting performance and a better operational efficiency (output coefficient) by finding a best or effectively used range regarding the ftinctions such as the blade angle, the blade center, the solidity, and the blade thickness. Hereinafter, a research result with an analysis thereof regarding the factors will be discussed.

Figure 5:
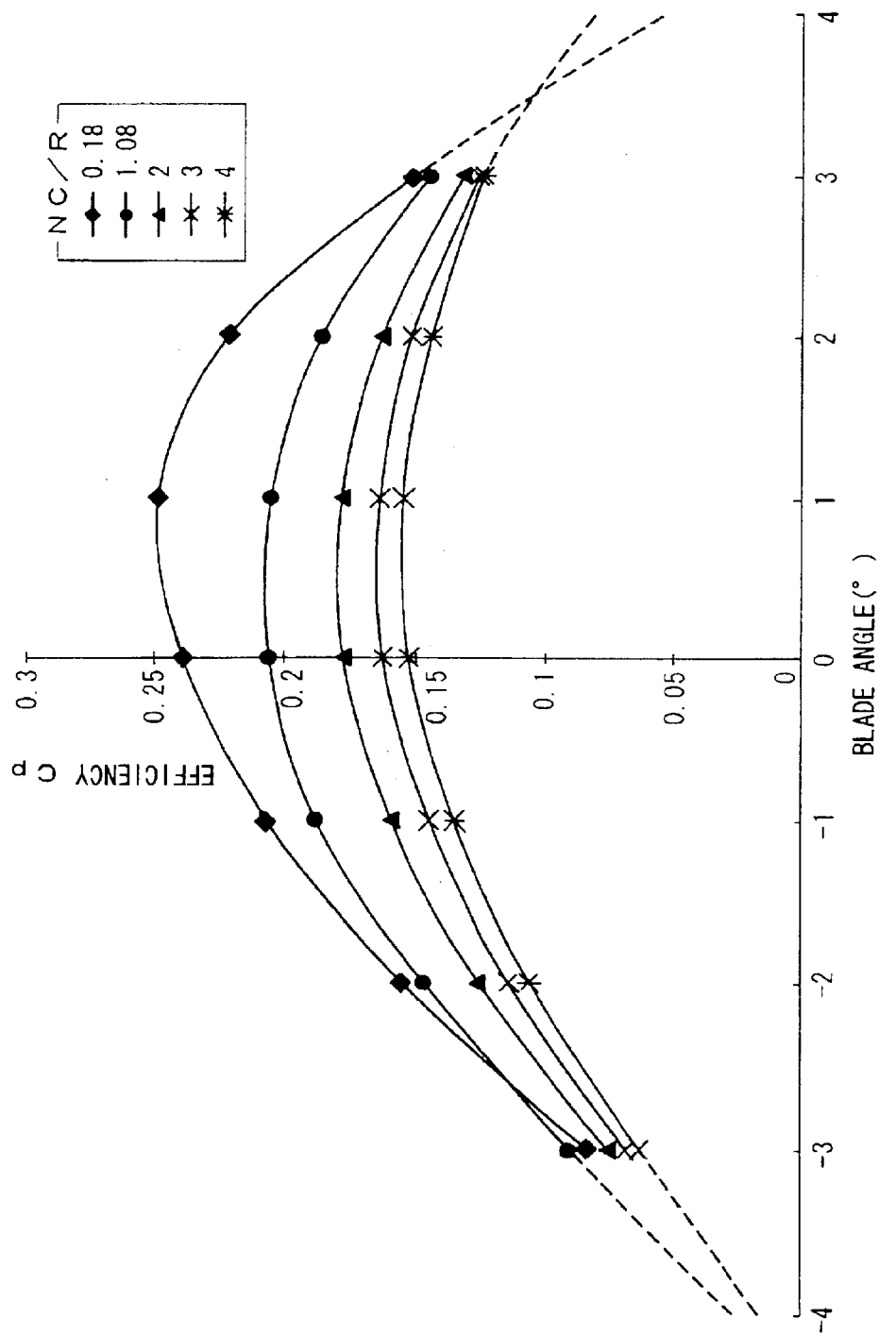
FIG. 5 is a graph showing a relationship between the blade angle and an efficiency (output coefficient) of the turbine.

First, a research result regarding the blade angle and the efficiency (output coefficient) is shown in a graph of FIG. 5. In FIG. 5, a vertical coordinate indicates an efficiency and a horizontal coordinate indicates a blade angle (°), while solidities (NC/R) were selected sequentially between 0.18 and 4.0, which were five (0.18, 1.08, 2.0, 3.0, and 4.0).

As understood from the FIG. 5, the efficiency of the turbine varies greatly with the blade angles. A blade angle between +4° and -4° or at most between +5° and -5° is practical while the solidifies were within an extremely large range from 0.18 to 4.0. A blade angle more than +4° or less than -4°, or at most more than +5° or less than -5° is unpractical because a maximum efficiency of the turbine is almost zero. For obtaining a better efficiency (for example, more than 0.1) in FIG. 5, a blade angle between +20 and -2° or at most between +3° and -3° can be selected. A blade angle between +2° and -2° enables an efficiency (output coefficient) more than a half of a maximum (0.25 in FIG. 5). A blade angle between +1° and -1° is best.

In FIG. 5, a maximum efficiency is obtained at a blade angle of +1° when the solidity is 0.18. When the solidity is between 1.08 and 4.0, a maximum efficiency is obtained between 00 and +10. Generally, a higher efficiency is obtained at a blade angle of+1° than -1°, at a blade angle of +2° than -2°, or at a blade angle of +3° than -3°. That is, a plus blade angle provides an efficiency higher than a minus blade angle as a whole. This tendency appears in a wind turbine as well as a water turbine.

Figure 6:
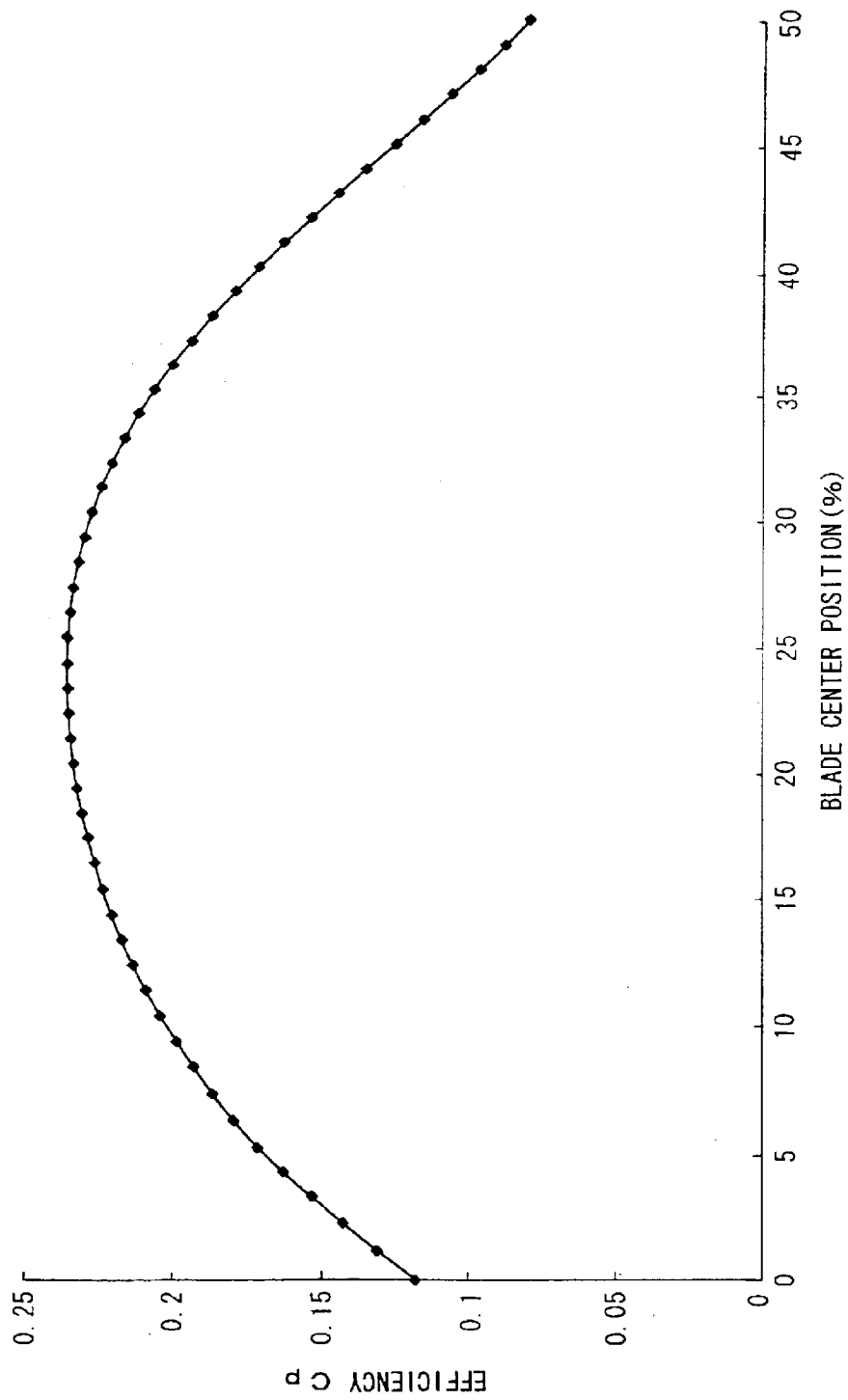
FIG. 6 is a graph showing a relationship between the blade center and an efficiency of the turbine.

Next, referring to FIG. 6, a research result regarding the blade center and the efficiency (output coefficient) will be discussed. In FIG. 6, a vertical coordinate indicates an efficiency and a horizontal coordinate indicates a blade center (%), while the solidity (NC/R) is represented by a single value of 0.18. For example, the radius of the turbine is 1.25 meter and the chord length C is 0.3 meter.

In FIG. 6, a maximum efficiency (0.235) is obtained at a blade center of 25%. A relatively stable efficiency (output coefficient) between 0.118 and 0.079 is obtained when the blade center is positioned between 0% and 50%.

When the blade center is 0%, a line radially extended from the shaft (that is, along the strut blade) aligns with the fore end of the straight blade in FIG. 4A. When the blade center is 50%, a line radially extended from the shaft crosses the blade chord line at the middle of the chord length. In FIG. 6, a most preferable blade center is 25%, while a line radially extended from the shaft crosses the chord length at a quarter of the chord length from the fore end of the straight blade in FIG. 4A.

Figure 7:
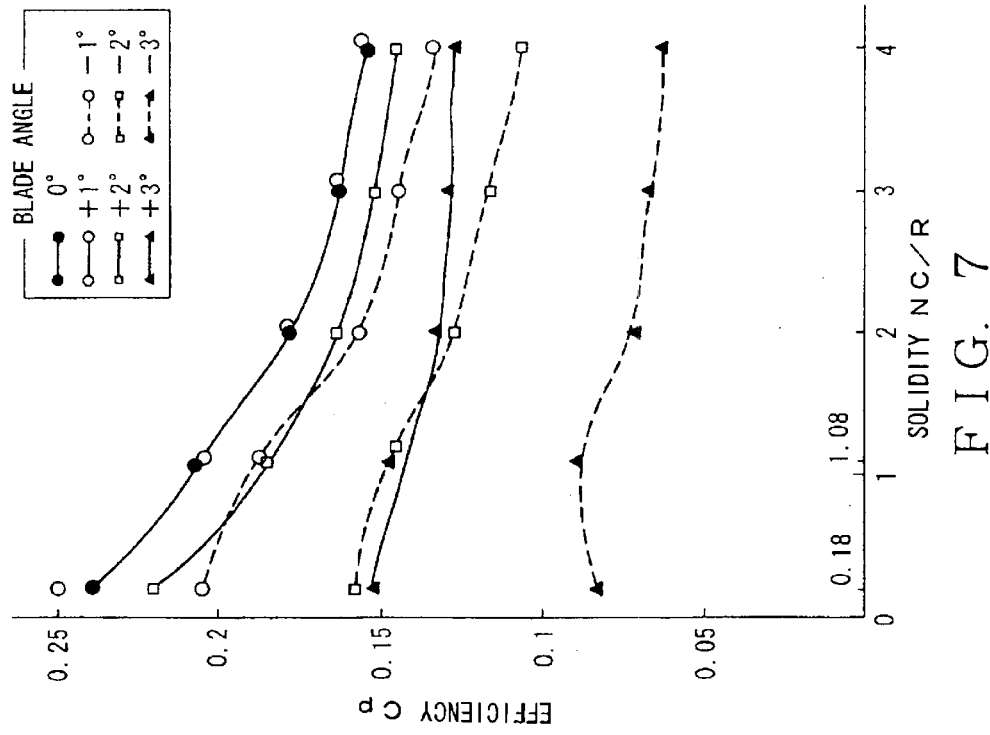
FIG. 7 is a graph showing a relationship between a solidity (NC/R) and an efficiency of the turbine, which includes curves each related to each blade angle.

A preferable blade center is positioned within a comparatively wide range of 0% to 50% in FIG. 6. However, a head falling moment (a force exerted by the fore end of the straight blade toward the shaft) of the straight blade does not work effectively around the blade center of 0%. Thus, a blade center more than 15% is practical to keep a preferable self starting performance. For obtaining an efficiency more than 0.1, the blade center is determined not within 50% but within 40%. This, a desirable blade center is selected between 15% and 40%. The tendency of FIG. 6 appears in a wind turbine as well as a water turbine. FIG. 7 is a graph showing a relationship between the solidity and the efficiency, which is rewritten from FIG. 5. In FIG. 7, a vertical coordinate indicates an efficiency (output efficiency) and a horizontal coordinate indicates a solidity (NC/R), while the blade angles are 0°, +1°, +2°, +3°, -1°, -2°, and -3°.

As illustrated in FIG. 7, a larger solidity provides a smaller efficiency, which is a known matter. The efficiencies at a blade angle of 0° are almost the same as those at a blade angle of +1°. The efficiencies at a blade angle of +2° are approximately equal to those at a blade angle of -1°. The efficiencies at a blade angle of +3° are approximately equal to those at a blade angle of -2°. The efficiencies at a blade angle of -3° are greatly reduced to become lower than 0.1. From FIG. 7, it is noted that a blade angle is preferably selected between +3° and -2°, while a solidity is selected between 0.18 and 4.0.

Practically, the solidity of 3 or 4 can not be selected. For example, a turbine having a solidity of the straight blade 3 includes a diameter of 0.3 meter and three straight blades with a 0.3 meter chord length. This configuration is almost unpractical. A larger solidity decreases a wind or water stream entering the turbine (in an inner space of the straight blades 3) to decrease a flow speed thereof, reducing the rotation speed and torque of the turbine. Thus, a solidity around 2 is a practical upper limit because each curve of FIG. 7 becomes to have a gentle slope there. A more practical upper limit of the solidity is 1 or 1+α (α is preferably around 0.2) in consideration of the blade angles including -3°.

A larger solidity provides a better self starting performance (a known matter). The solidity should have a lower limit larger than 0.18 in view of the self starting performance. The lower limit should be selected between 0.18 and 1, preferably around 0.6. An analysis of the solidity will be discussed later. The tendency of FIG. 7 appears in a wind turbine as well as a water turbine.

A part of original data corresponding to FIGS. 5 to 7 is shown for reference in Table 1.

TABLE 1

| Blade center (%) | Blade angle (°) | Efficiency | Tip speed ratio β at efficiency peak (for reference) |
|---|---|---|---|
| 0 | 3.43 | 0.118 | 2.6 |
| 10 | 2.06 | 0.203 | ↑ |
| 20 | 0.69 | 0.233 | ↑ |
| 25 | 0 | 0.235 | ↑ |
| 30 | -0.69 | 0.227 | ↑ |
| 40 | -2.06 | 0.171 | ↑ |
| 50 | -3.43 | 0.079 | ↑ |

The tip speed ratio described in Table 1 is a ratio of a rotational speed of the straight blade at its fore end to a wind or water stream speed. The tip speed ratio of 2.6 means that the straight blade moves 2.6 times of a wind or water stream speed. The efficiency of the turbine varies greatly with the tip speed ratio which will be discussed later.

FIG. 8 is a graph showing a relationship between the solidity and the efficiency (output coefficient) while the solidity extends from an extremely small value less than 0.1 to 3.5. In that case, the straight blade has a comparatively thin symmetric blade (NACAOO12) having a blade thickness of 12%.

As understood from FIG. 8, a solidity of 0.1 corresponds to an efficiency more than 0.1. A curve of the efficiency rises up sharply to have a peak around a solidity of 0.35. The efficiency decrease rapidly where the solidity varies from 0.35 to 0.65, and the efficiency decreases gently where the solidity varies from 0.65 to 2.2. The efficiency is almost constant where the solidity is around 2.2 and further decreases where the solidity increases from 2.4.

From an analysis of FIG. 8, it is understood that a better efficiency of the turbine is obtained where the solidity is determined between 0.1 and 0.65. Meanwhile, a better starting performance of the turbine is obtained where the solidity is determined between 0.65 and 2.2 although the efficiency becomes lower.

An efficiency maximum $Cp_{max}$ varies with a Reynolds number Re and a blade profile (section profile). $Cp_{max}$ varies between 0.2 and 0.48. The Reynolds number related to FIG. 8 is $1.33 \times 10^5$. The efficiency varies also with the tip speed ratio of the straight blade. The tendency of FIG. 8 appears in a wind turbine as well as a water turbine.

Figure 9:
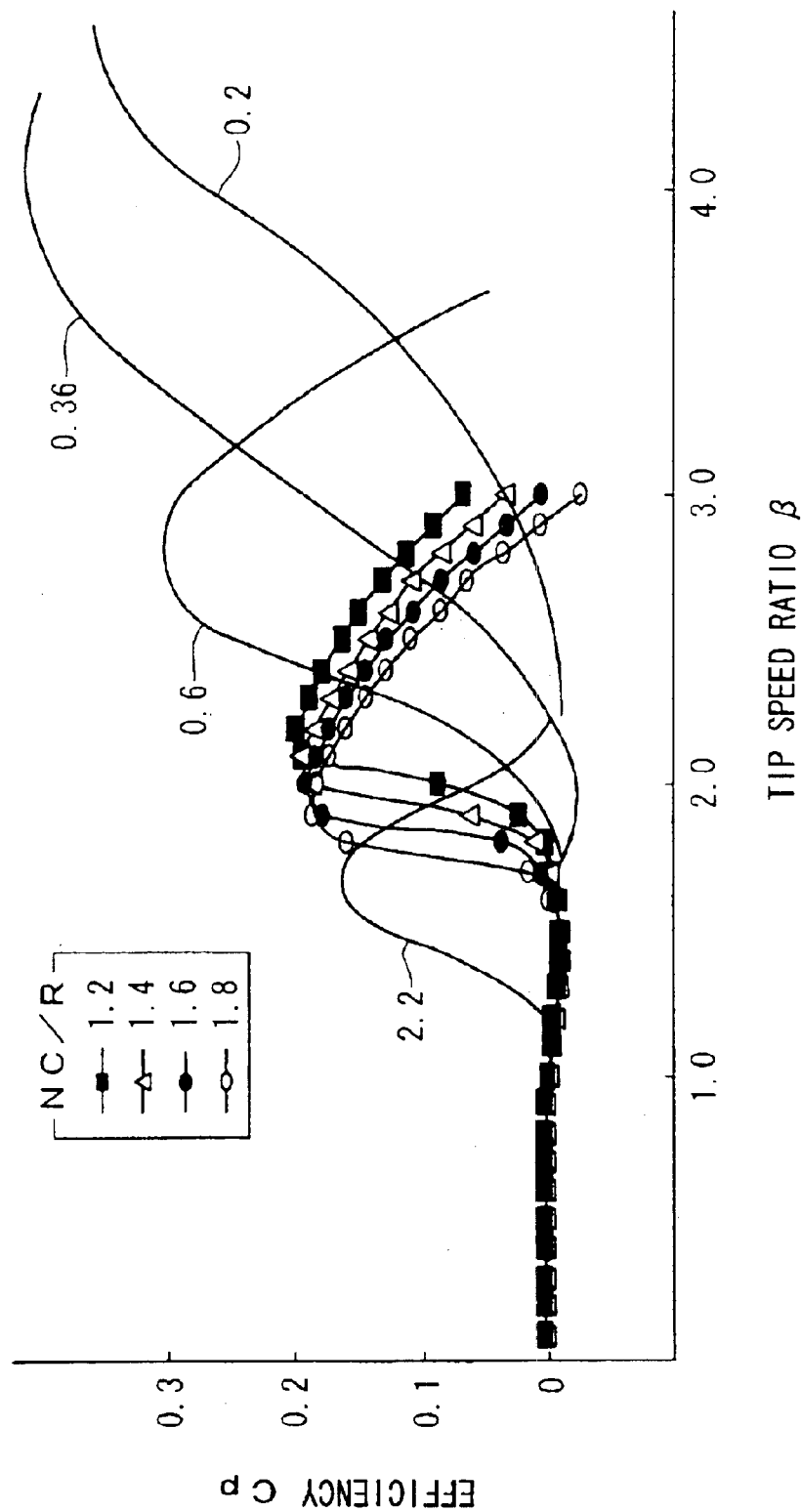
FIG. 9 is a graph showing a relationship between a tip speed ratio and an efficiency of a turbine, which includes curves each related to each solidity.

FIG. 9 is a graph showing a relationship between the tip speed ratio and the efficiency (output coefficient) while the solidity is sequentially selected from 0.36, 0.6, 1.2, 1.4, 1.6, 1.8, and 2.2. As well understood from FIG. 9, the efficiency increases when the tip speed ratio increases, that is, when a ratio of the rotation speed of the straight blade to a wind or water stream speed increases. A less tip speed ratio β corresponds to a larger solidity while a larger tip speed ratio corresponds to a less solidity. The tendency of FIG. 9 appears in a wind turbine as well as a water turbine.

Figure 10:
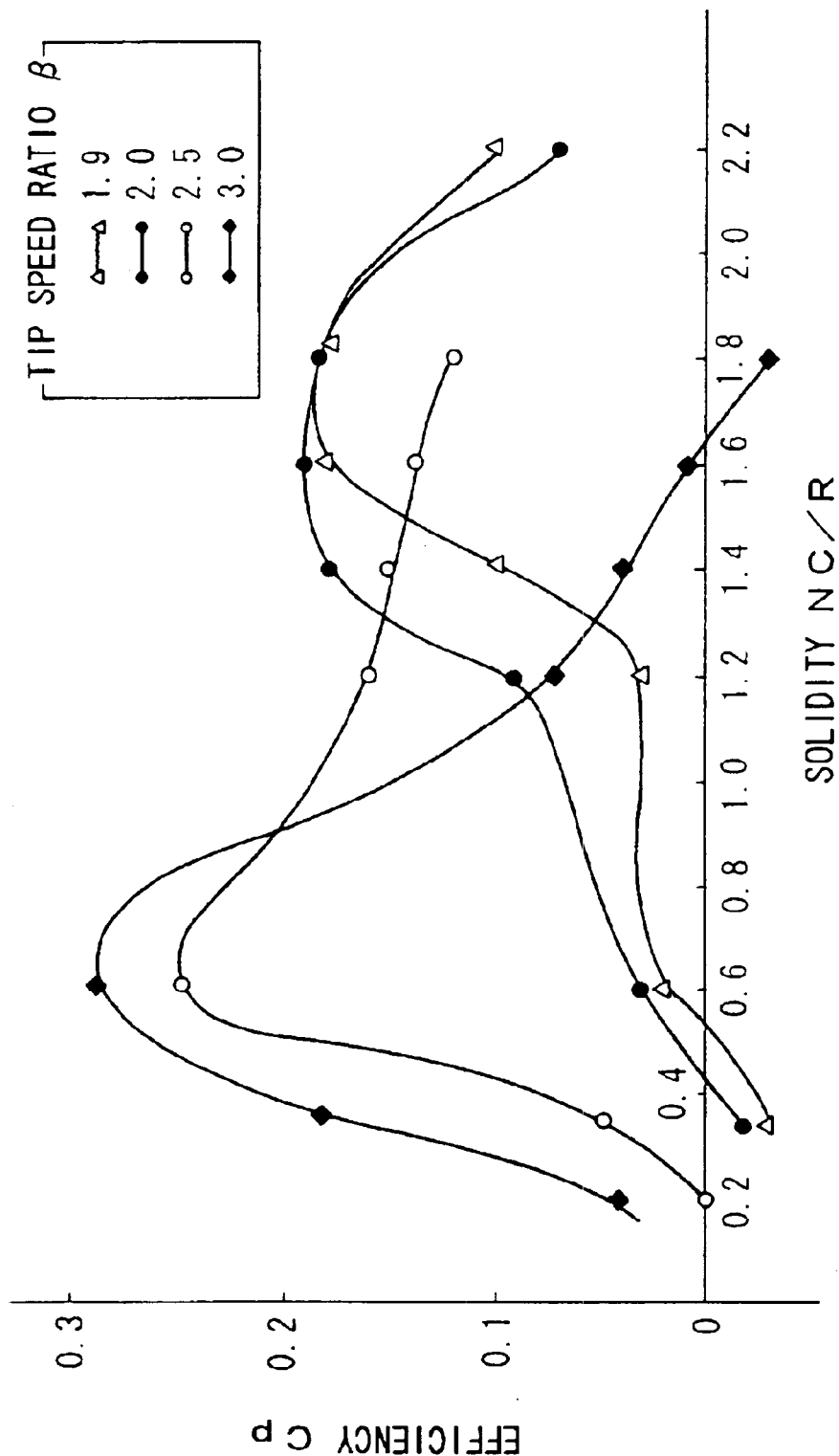
FIG. 10 is a graph showing a relationship between a solidity and an efficiency of a turbine based on FIG. 9, which includes curves each related to each tip speed ratio.

FIG. 10 is a graph showing a relationship between the solidity and the efficiency, which is rewritten from FIG. 9. In FIG. 10, a vertical coordinate indicates an efficiency and a horizontal coordinate indicates a solidity, while the tip speed ratios are four of 1.9, 2.0, 2.5, and 3.0.

As well understood from FIG. 10, a larger tip speed ratio β (2.5 or 3.0) provides a maximum efficiency within a less solidity range, while a less tip speed ratio β (1.9 or 2.0) provides a maximum efficiency within a larger solidity range.

Thus, a faster rotation of the turbine requires a less solidity thereof, while a slower rotation of the turbine requires a larger solidity thereof. From an analysis of FIG. 10, it is understood that the solidity is determined to be more than 0.6, preferably between 0.6 and 1.2, or between 0.6 and 2.2 to achieve a better starting performance. A larger solidity and a less tip speed ratio are advantageous for a safety of the turbine such as a dynamic strength and a fatigue strength. The tendency of FIG. 10 appears in a wind turbine as well as a water turbine. The performance of the straight blade type turbine is represented by characteristic equations described hereinafter.

Speed reduction ratio $a = \frac{1}{2}\{1 - \sqrt{(1 - C_{fx})}\}$ $V_R = (1-a)\sqrt{(1 - 2\beta \sin \theta + \beta^2)}$ Resistance coefficient $C_{fx} = -(nls/4\pi)\int_{-0}^{2}\pi V_R^2 \{(C_L\cos\varphi +$ $C_D\sin\varphi)\cos\phi + (C_D\cos\varphi -$ $C_L\sin\varphi)\sin\phi\} d\phi$ $C_{TB} = (nls/4\pi)\int_{-0}^{2}\pi V_R^2 (C_L\sin\varphi - C_D\cos\varphi - C_M ls) d\phi$ Efficiency $Cp = \beta \times C_{TB}$ Where $L_B$: Chord Length $C_B$/Radius R
$V_R$: Wind or Water Speed (relative to blades)
θ: Turned Angle of Turbine
φ: Stream Attack Angle
$C_L$: Lift Coefficient
$C_D$: Reseistance Coefficient
$C_M$: Moment Coefficient Table 2 shows, for reference, an analysis result obtained from experiments and calculations to generally indicate a relationship amond a solidity, a self starting performance, and an efficiency of the turbine.

TABLE 2

| NC/R | Starting Performance | Efficiency $C_p$ | Tip Speed Ratio at efficiency peak |
|---|---|---|---|
| 0.1 | unacceptable | small | large |
| 0.2 | unacceptable | middle | large |
| 0.3 | unacceptable | large | 3.9 |
| 0.4 | unacceptable | large | 3.4 |
| 0.5 | acceptable | middle | 3.0 |
| 0.6 | acceptable | middle | 2.9 |
| 0.7 | acceptable | middle | 2.6 |
| 0.8 | acceptable | small | 2.5 |
| 1.0 | good | small | 2.3 |
| 1.2 | good | small | 2.1 |
| 1.4 | good | small | 2.0 |
| 1.6 | good | small | small |
| 1.8 | good | small | small |
| 2.0 | good | small | small |
| 2.2 | good | small | small |
| 2.4 | good | small | small |

In Table 2, a first column shows solidities; a second column shows starting performances; a third column shows efficiencies; and a forth column shows tip speed ratios at efficiency peaks.

From an analysis of Table 2, the solidity is preferably selected between 0.5 and 0.8 to obtain an appropriate starting performance and an adequate efficiency which allow an acceptable electric generating performance.

A most appropriate value of the solidity is around 0.7 in view of a low tip speed ratio enabling enough strength of the turbine, in which the starting performance is middle and the efficiency is middle while the tip speed ratio is a lower value. Even a solidity between 0.8 and 2.2 may be selected since the efficiency decreases a little as illustrated in FIGS. 7 and 8. The tendency of Table 2 appears in a wind turbine as well as a water turbine The starting performance and the efficiency are effected by a thickness T (see FIG. 4A) of the straight blade and a thickness of the strut blade as well as the solidity that is a blade area ratio determined by a radius R of the turbine, the number N of the straight blades, and a chord length C. An analysis of the thickness of the straight blade and the strut blade will be discussed hereinafter.

Table 3 shows an analysis of a relationship of a thickness of the straight blade (main blade) with a self starting performance, an efficiency, and a strength of the turbine, which is obtained from experiments and calculations thereof.

TABLE 3

| Blade thickness (%) | Starting performance | Efficiency | Strength |
|---|---|---|---|
| 5 | unacceptable | unacceptable | unacceptable |
| 10 | unacceptable | unacceptable | unacceptable |
| IS | acceptable | acceptable | acceptable |
| 20 | good | good | good |
| 25 | good | good | good |
| 30 | acceptable | acceptable | good |
| 35 | unacceptable | unacceptable | good |
| 40 | unacceptable | unacceptable | good |

Table 3, the blade thickness is represented by a ratio (percent) of a maximum blade thickness to a chord length C. As well understood from Table 3, a blade thickness selected between 20% and 25% is most appropriate where the starting performance, the efficiency, and the strength of the turbine are acceptable. A practical blade thickness may be selected between 15% and 30%. A blade thickness of 30% is better than a blade thickness of 15% in the starting performance although either of the thicknesses are acceptable in the starting performance.

A larger blade thickness selected between 35% and 40% increases a rigidity of the straight blade but increases also the straight blade in weight. The increased weight is disadvantageous to keep a mechanical strength of the turbine during the rotation of the turbine. The strength of the straight blade may be acceptable when the blade thickness is 30% and may be acceptable when the blade thickness is between 35% and 40%. Therefore, the straight blade has to be made of a fiber material having a lighter weight with a higher strength such as a glass fiber and a carbon fiber. The fiber material may have a thickness around 2 millimeters.

During the rotation of the turbine, the straight blade receives a yawing moment around an axis oriented in a resistance direction (direction X), a pitching moment around an axis oriented in a transverse direction (direction Y), and a turning moment around an axis oriented in a lift direction (direction Z). Thus, the straight blade has to a strength enough for these moments. The tendency of Table 3 appears in a wind turbine as well as a water turbine.

Table 4 shows an analysis of a relationship of a thickness of the strut blade (symmetric blade) with a self starting performance, a rotational resistance (efficiency decreasing factor), and a strength of the turbine, which was obtained from experiments and calculations thereof.

TABLE 4

| Blade Thickness (%) | Starting Performance | Rotational Resistance | Strength |
|---|---|---|---|
| 5 | unacceptable | small | unacceptable |
| 10 | unacceptable | small | unacceptable |
| 15 | acceptable | middle | acceptable |
| 20 | acceptable | middle | acceptable |
| 25 | good | large | good |
| 30 | good | large | good |
| 35 | good | large | good |
| 40 | good | large | good |
| 45 | good | large | good |

The strut blade of Table 4 is the blade symmetric relative to a horizontal line as shown in FIG. 3. The rotational resistance is a fluid resistance oriented in a direction of a wind or a water. A smaller thickness of the strut blade achieves a higher efficiency but decreases the strut blade in the self starting performance. The strut blade also receives three moments as well as the straight blade.

From Table 4, a blade thickness more than 15% can be applied to the strut blade to obtain an adequate starting performance of the turbine. A blade thickness selected between 15% and 20% has s middle rotational resistance but is best in view of the starting performance. Since the blade thickness selected between 15% and 20% achieves a middle strength, the straight blade can be supported, for example, by a couple of the strut blades to obtain a reliable strength.

For obtaining a better starting performance, a blade thickness ratio of 40% can be practical, although the rotational resistance is large and the efficiency becomes smaller. The strut blade has a strength higher than the straight blade when the blade thickness is within a larger range. Because, the blade profiles are different from each other and the strut blade has a configuration suitable for a gravity force. A blade thickness of 5% to 10% is disadvantageous for the starting performance and the strength but provides a smaller rotational resistance. The strut blade having a blade thickness of 5% to 10% can be used if the number of strut blades are increased to achieve an appropriate strength of the turbine. The tendency of Table 4 appears in a wind turbine as well as a water turbine.

To summarize the above discussion, as understood from FIGS. 5 to 10 and Tables 1 and 2, the solidity (NC/R) is preferably determined to be not less than 0.5 for achieving a self starting performance of the turbine. The solidity between 0.65 and 1.2 is best. The solidity between 0.5 and 2.2 can be practically used. However, the solidity between 0.1 and 0.5 can be used to keep an acceptable efficiency of the turbine if the starting performance is compensated by a starting device.

As understood from FIG. 5, the blade angle of the straight blade between +1° and −1° or between +2° and −2° is best. A blade angle between +5° and −5° is practically used. A blade angle more than +5° or less than −5° is unpractical. FIG. 5 includes a view of the variation of the solidities, and the best or practical range of the blade angle can be applied to each of the solidities described in FIG. 5.

From FIG. 6, the blade center of the straight blade is best located at 25% from the fore end. A practical blade center is selected between 15% and 40% in view of a self starting performance (a head falling moment). The best or practical range of the blade center can be applied to each of the solidities described above.

From Table 3, the straight blade thickness selected between 20% and 25% is most appropriate in view of the starting performance, the efficiency, and the strength of the turbine. A preferable thickness may be selected between 20% and 30%. From Table 4, the strut blade thickness selected between 15 and 20% is most appropriate in view of the starting performance, the resistance, and the strength.

Each factor of the blade angle, the blade center, the solidity, and the bade thickness may be separately determined. These factors may be determined to be in conformity with each other. For example, ten combinations of the five factors are as follows:

A blade angle between +5° and −5° or between +2° and −2° is combined with a blade center of 25% or between 15% and 40%;

a blade angle between +5° and −5° or between +2° and −2° is combined with a solidity between 0.5 and 2.2 or between 0.65 and 1.2;

a blade angle between +5° and −5° or between +2° and −2° is combined with a staight blade thickness between 20% and 30; and a blade angle between +5° and −5° or between +2° and −2° is combined with a strut blade thickness between 15% and 20%.

Another combination of the three factors of the blade angle, the blade center, and the solidity may be possible as well as further another combination of the four or five factors of the blade angle, the blade center, the solidity, the thicknesses of the straight blade and the strut blade.

Particularly, the following combinations are preferable in view of the efficiency and the self starting performance of the turbine. Such combinations are:

A blade angle between +2° and −2° is combined with a solidity between 0.65 and 1.2;

a blade center of 25% is combined with a solidity between 0.65 and 1.2;

a solidity between 0.65 and 1.2 is combined with a straight blade thickness between 20% and 30%; and a solidity between 0.65 and 1.2 is combined with a straight blade thickness between 20% and 30% and a strut blade thickness between 15% and 20%.

In place of the strut blades 4, a circular thin plate may be used. The upper and lower strut blades may be replaced by a single central strut blade having a sufficient strength. The shaft 2 of the straight blade type turbine 1 may be replaced by a pair of upper and lower short column bosses (not shown). The straight blade type turbine may be mounted on a high side wall of a tall building with an axis of the turbine being horizontal. When the turbine is utilized as a water turbine, each straight blade 3 is submerged into water with an axis of the water turbine being vertical such that a free end of the water turbine is oriented ahead. A submerged length of the straight blade 3 may be changed according to an electricity generating quantity or a stream speed of the water. The straight blade type turbine 1 is used not only for an electricity generation but also for a heat converter and an energy converter to lift water. The present invention is also applied to a manufacturing method of a straight blade type turbine.

Figure 11A:
FIGS. 11A, 11B, and 11C are sequentially a top view, a front view, and a side view of a stream line convex located at an end of the straight blade.
Figures 11B, 11C:
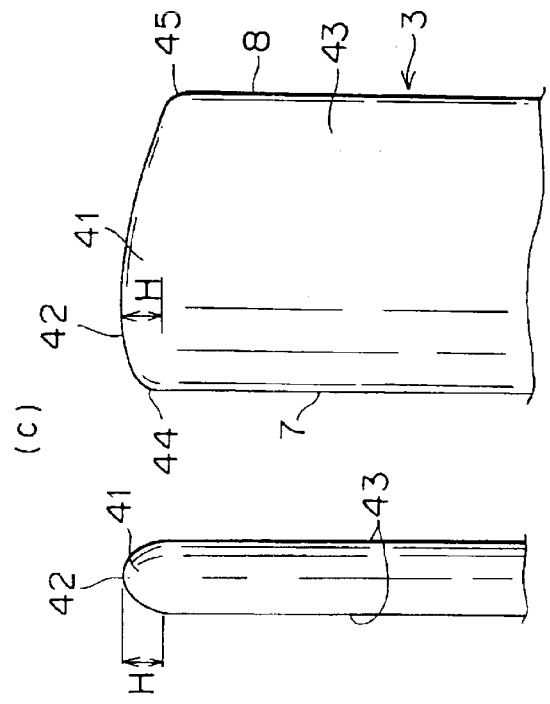

FIGS. 11A, 11B, and 11C show the straight blade (main blade) 3 which has a stream line convex 41 to reduce a rotational noise of the straight blade type turbine 1. The convex 41 is defined in each of upper and lower edges of the straight blade (only an upper one is illustrated) with a longitudinal axis of the straight blade being vertical. The convex 41 is has a height H (or thickness) which is about a half of the maximum sectional thickness of the straight blade.

FIG. 11A is a top view (a reduced scale drawing of FIG. 2) of the straight blade 3; FIG. 11B is a front view (in a rotation direction), and FIG. 11C is a side view. As illustrated in FIG. 11C, the convex 41 has a profile which is an upper or lower half obtained by cutting the blade profile of FIG. 2 along the blade chord line 11. The convex 41 has round head 42 symmetric relative to a vertical center line in the front view of FIG. 11B. In FIG. 11B, the round head 42 is smoothly contiguous with each side surface 43 of the straight blade 3. The profile of the convex 41 is not limited in the shape of the straight blade 3.

As illustrated in FIGS. 11A and 11B, the round head 42 of the convex 41 is a smooth curve shown in FIG. 11B between a fore end 44 and a middle of the convex 41. The round head 41 has a gradually decreased thickness between the middle and a rear end 45 of the convex 41 as shown in FIG. 11A. The fore end 44 and the rear end 45 of the convex 41 are smoothly contiguous to the fore edge 7 or a rear edge 8 of the straight blade. Preferably, the convex 41 is integrally formed with the straight blade 3 in use of the fabric material.

A ratio of the height H (or thickness) of the convex 41 to the chord length is preferably between 12% and 17%, which is a half of the ratio between 24% and 34% applicable to the straight blade 3. Because, the straight blade has a section generally symmetrical relative to a center line. This preferable range is based on an experimental data.

The convex 41 having the height (or thickness) ratio selected between 12% and 17% eliminates an acoustic noise otherwise generated around the upper and lower ends of the straight blade which is used for a wind turbine. Because, the convex 41 can avoid eddies generated in a rear side of the upper or lower end of the straight blade. The convex 41 having the height (or thickness) ratio selected between 12% and 17% eliminates a noise otherwise generated around the upper and lower ends of the straight blade which is used for a water turbine In place of the blade-shaped convex 41, there may be provided a side plate (not shown) at each of upper and lower ends of the straight blade 3. Preferably, the side plate is a circular one which joins a plurality of straight blades 3 to each other in place of the strut blades 4. The side plate may be appropriately designed in shape.

The blade-like convex 41 and the side plate may be designed independently or may be determined in combination with any of the factors among the blade angle of FIG. 5, the blade center of FIG. 6, the solidity of FIGS. 7 to 10 and Table 2, the straight blade thickness of Table 3, and the strut blade thickness of Table 4.

What is claimed is:

1. A straight blade type turbine having at least one two-dimensional blade positioned in parallel with and around a central axis of the turbine, the two-dimensional blade having a cross-section with a blade chord turned around a center of the two-dimensional blade by an angle of 3° to −2° relative to a line perpendicular to another imaginary line connecting the central axis with the center of the two-dimensional blade;

a distance between a fore end and the center of the cross section is 15 to 40 percent is a chord length of the blade;

a calculated NC/R of between 0.5 and 2.2, wherein R is a radius extending from the axis to the center of the two-dimensional blade, C is the chord length, and N is the number of the two-dimensional blades; and a maximum thickness of the two-dimensional blade is between 20 and 25 percent of the chord length.

2. The turbine according to claim 1, wherein the turbine comprises a strut blade having a symmetric cross section joining the two-dimensional blade to a side of the central axis, the strut blade having a maximum thickness which is between 15 and 20 percent of a chord length of the strut blade.

3. A straight blade type turbine according to claim 1, wherein the two-dimensional blade is provided with a stream line that is convex at a longitudinal end of the blade, the stream line convex having a thickness which is substantially a half of a maximum thickness of the two-dimensional blade.

4. The turbine according to claim 3, wherein the stream line convex has a thickness which is between 12 and 17 percent of a chord length of the strut blade.

* * * * *